United States Patent
Gao et al.

(10) Patent No.: US 9,332,453 B2
(45) Date of Patent: May 3, 2016

(54) WWAN ALMANAC INTEGRITY MONITORING SYSTEM

(71) Applicant: QUALCOMM Incorporated, San Diego, CA (US)

(72) Inventors: Weihua Gao, San Jose, CA (US); Sai Pradeep Venkatraman, Santa Clara, CA (US); Gengsheng Zhang, Cupertino, CA (US); Mark L. Moeglein, Ashland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 13/929,322

(22) Filed: Jun. 27, 2013

(65) Prior Publication Data

US 2015/0004997 A1  Jan. 1, 2015

(51) Int. Cl.
| | |
|---|---|
| *H04W 24/00* | (2009.01) |
| *H04W 24/10* | (2009.01) |
| *H04W 4/02* | (2009.01) |
| *G01S 19/08* | (2010.01) |
| *G01S 5/02* | (2010.01) |
| *H04W 64/00* | (2009.01) |

(52) U.S. Cl.
CPC .............. *H04W 24/10* (2013.01); *G01S 5/0236* (2013.01); *G01S 5/0252* (2013.01); *G01S 19/08* (2013.01); *H04W 4/021* (2013.01); *G01S 5/021* (2013.01); *G01S 5/0242* (2013.01); *H04W 64/00* (2013.01)

(58) Field of Classification Search
USPC ........ 455/456.1, 450, 561, 456.5, 456.2, 440, 455/436
See application file for complete search history.

(56) References Cited

U.S. PATENT DOCUMENTS

| | | | |
|---|---|---|---|
| 6,757,536 B1 * | 6/2004 | Kim ....................... | H04B 7/022 455/436 |
| 2006/0009235 A1 | 1/2006 | Sheynblat et al. | |
| 2007/0270168 A1 | 11/2007 | Sheynblat | |
| 2009/0280775 A1 | 11/2009 | Moeglein et al. | |
| 2011/0053613 A1 * | 3/2011 | Zhou ..................... | H04W 64/00 455/456.5 |
| 2011/0057836 A1 | 3/2011 | Ische et al. | |
| 2011/0143812 A1 * | 6/2011 | Ogawa .................... | H04W 8/26 455/561 |
| 2012/0052883 A1 | 3/2012 | Austin et al. | |
| 2012/0309376 A1 | 12/2012 | Huang et al. | |
| 2014/0295861 A1 * | 10/2014 | Chien et al. .................. | 455/450 |

FOREIGN PATENT DOCUMENTS

WO        2012166370 A1    12/2012

OTHER PUBLICATIONS

International Search Report and Written Opinion—PCT/US2014/039750—ISA/EPO—Oct. 23, 2014.

* cited by examiner

*Primary Examiner* — David Q Nguyen
(74) *Attorney, Agent, or Firm* — Silicon Valley Patent Group LLP

(57) ABSTRACT

Method, apparatus and computer program product for monitoring wireless wide area network almanac integrity in a wireless wide area network are disclosed. In one embodiment, the method comprises receiving crowdsourcing data from a plurality of mobile devices, determining a change to a wireless wide area network almanac using the crowdsourcing data, and updating a database in accordance with the change to the wireless wide area network almanac.

31 Claims, 6 Drawing Sheets

WWAN ALMANAC INTEGRITY MONITORING SYSTEM

FIELD

The present disclosure relates to the field of wireless communications. In particular, the present disclosure relates to method, apparatus and computer program product for monitoring integrity of wireless wide area network (WWAN) almanac are disclosed.

BACKGROUND

The position of a mobile station, such as, for example, a cellular telephone, may be estimated based on information gathered from various systems. One such system may comprise the Global Positioning System (GPS), which is one example of a satellite positioning system (SPS). SPS systems such as GPS may comprise a number of space vehicles (SV) orbiting the earth. Another example of a system that may provide a basis for estimating the position of a mobile station is a cellular communication system comprising a number of terrestrial base stations to support communications for a number of mobile stations.

A position estimate, which may also be referred to as a position "fix", for a mobile station may be obtained based at least in part on distances or ranges from the mobile station to one or more transmitters, and also based at least in part on the locations of the one or more transmitters. Such transmitters may comprise SVs in the case of an SPS and/or terrestrial base stations in the case of a cellular communications system, for example. Ranges to the transmitters may be estimated based on signals transmitted by the transmitters and received at the mobile station. The location of the transmitters may be ascertained, in at least some cases, based on the identities of the transmitters, and the identities of the transmitters may be ascertained from signals received from the transmitters.

An almanac may be maintained for systems used for position estimation. The almanac may contain various types of information, including, for example, information that may be used in position estimation operations. Such information may include the identities and locations of the various transmitters of the system, for example. However, in some situations, a network operator may decide to change or renumber its mobile network code, change or renumber one or more local area code(s) associated with the mobile network code, change or renumber one or more base station identifier associated with a local area code. These changes in mobile network code, local area code, and base station identifiers can adversely impact the accuracy of the WWAN almanac, and which in turn may adversely impact the accuracy of position fix generated based on the WWAN almanac.

Therefore, it is desirable to have method, apparatus and system for monitoring and maintaining integrity of WWAN almanac.

SUMMARY

The present disclosure relates to methods and apparatus for monitoring and maintaining integrity of WWAN almanac. In one embodiment, the method comprises receiving crowdsourcing data from a plurality of mobile devices, determining a change to a wireless wide area network almanac using the crowdsourcing data, and updating a database in accordance with the change to the wireless wide area network almanac.

In yet another embodiment, an apparatus comprises one or more processors, one or more processors including processing logic, the processing logic comprising logic configured to receive crowdsourcing data from a plurality of mobile devices, logic configured to determine a change to a wireless wide area network almanac using the crowdsourcing data, and logic configured to update a database in accordance with the change to the wireless wide area network almanac.

In another embodiment, a computer program product comprises a non-transitory medium storing computer programs for execution by one or more computer systems. The computer program product includes code for receiving crowdsourcing data from a plurality of mobile devices, code for determining a change to a wireless wide area network almanac using the crowdsourcing data, and code for updating a database in accordance with the change to the wireless wide area network almanac.

In yet another embodiment, an system comprises means for receiving crowdsourcing data from a plurality of mobile devices, means for determining a change to a wireless wide area network almanac using the crowdsourcing data, and means for updating a database in accordance with the change to the wireless wide area network almanac.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

DESCRIPTION OF EMBODIMENTS

The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
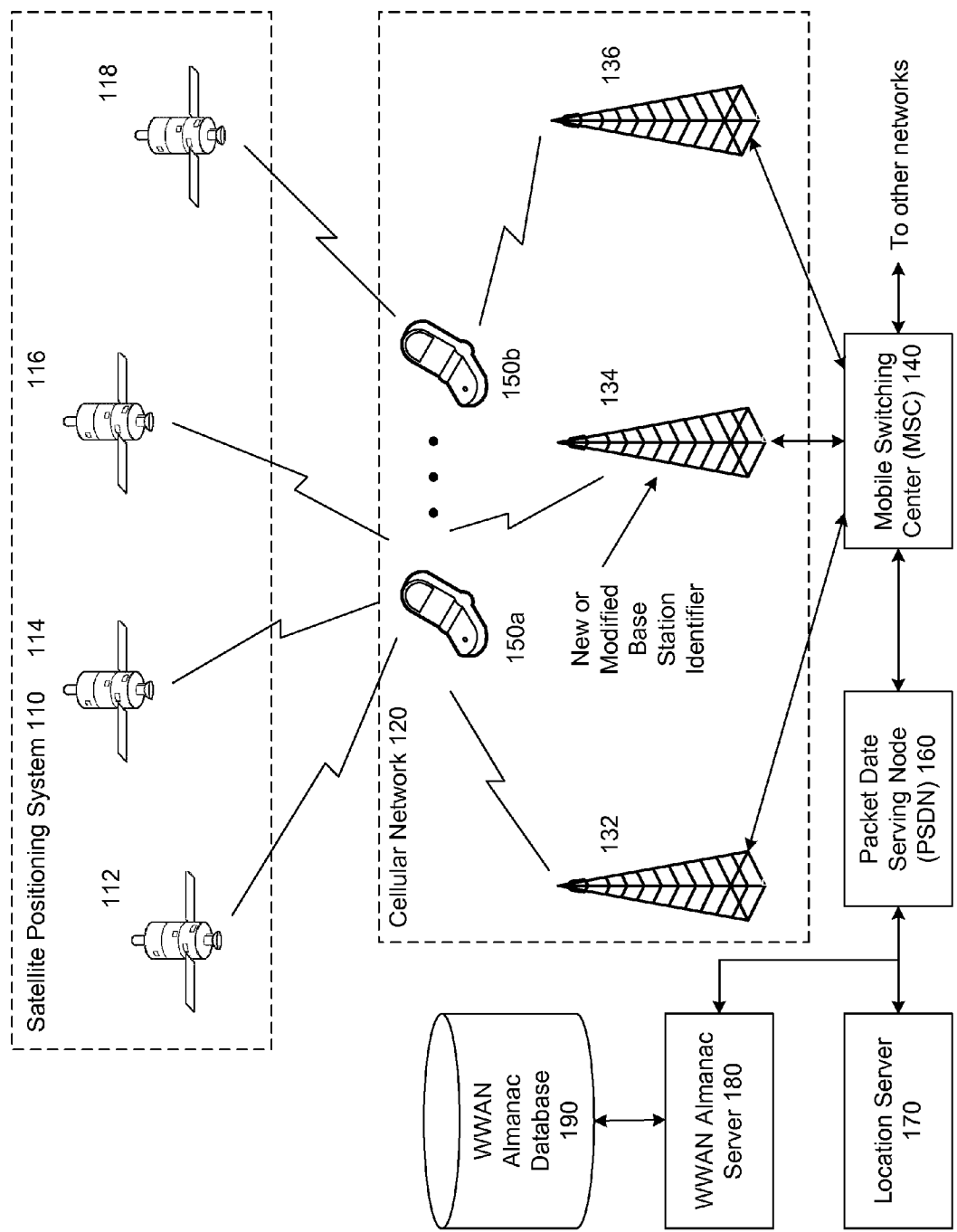
FIG. 1 illustrates a wireless communication system according to aspects of the present disclosure.

FIG. 1 illustrates a wireless communication system according to aspects of the present disclosure. As shown in FIG. 1, Cellular network 120 provides voice communication for a number of mobile stations including mobile stations 150a and 150b, and further supports position estimation for the mobile stations in addition to providing voice communication. Cellular network 120 may comprise any of a number of cellular network types, several examples of which are described below. Cellular network 120 includes base stations 132, 134, and 136 that provide communication for a number of wireless terminals such as mobile stations 150*a* and 150*b*. For simplicity, only a few base stations 132, 134, and 136 are depicted and mobile stations 150*a* and 150*b* are depicted in FIG. 1. Of course, other examples may include additional numbers of base stations and mobile stations.

According to aspects of the present disclosure, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a Time Division Synchronous Code Division Multiple Access (TD-SCDMA) network, a Worldwide Interoperability for Microwave Access (WiMAX, IEEE 802.16) network and so on. A CDMA network may implement one or more radio access technologies (RATs) such as cdma2000, Wideband-CDMA (W-CDMA), and so on. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A wireless local area network (WLAN) may be an IEEE 802.11x network, and a wireless personal area network (WPAN) may be a Bluetooth network, an IEEE 802.15x, or some other type of network. The techniques may also be implemented in conjunction with any combination of WWAN, WLAN and/or WPAN.

According to aspects of the present disclosure, the term "base station" is meant to include any wireless communication station and/or device typically installed at a fixed terrestrial location and used to facilitate communication in a wireless communications system, such as, for example, a cellular network. For example, base stations may be included in any of a range of electronic device types. A base station may comprise a wireless local area network (WLAN) access point. Such a WLAN may comprise an IEEE 802.11 x network.

According to aspects of the present disclosure, the term "mobile station" (MS), also referred to as mobile device or mobile client, refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processor and/or computing platform adapted to perform functions controlled by machine-readable instructions.

SPS 110 may comprise a number of SVs, for example SVs 112, 114, 116, and 118. For an example, SPS 110 may comprise one or more satellite positioning systems, such as GPS, GLONASS and Galileo. Mobile stations 150*a* and 150*b* may receive signals from SVs 112, 114, 116, and 118 and may communicate with one or more of base stations 132, 134, and 136. For example, mobile station 150 may obtain one or more measurements from one or more signals received from one or more of the SVs and/or base stations. However, in some circumstances timing signals from an SPS may not be available. In such a circumstance, a mobile station may gather propagation delay information through communication with one or more of base stations 132, 134, and/or 136. The mobile station (for example 150*a*) may calculate a position location for the mobile station based, at least in part, on timing calibration parameters received through communication with one or more of base stations 132, 134, and/or 136, and further based, at least in part, on known position locations of the base stations. The mobile station may also make use of an estimated propagation delay for signals received from a base station source, a satellite source, or both.

Position location determination calculations may be performed by a network entity such as, for example, location server 170 depicted in FIG. 1, rather than at a mobile station. Such a calculation may be based, at least in part, on information gathered by the mobile station (e.g. 150*a*) from one or more of base stations 132, 134, and/or 136. Location server 170 may transmit the calculated position location to the mobile station.

A mobile switching center (MSC) 140 for this example may be communicatively coupled to base stations 132, 134, and 136, and may be further coupled to other systems and networks, such as a public switched telephone network (PSTN), a packet data serving node (PDSN) 160, and so on. MSC 140 for this example provides coordination and control for the base stations 132, 134, and 136; and further controls the routing of data to/from the mobile stations served by these base stations. For the example depicted in FIG. 1, PDSN 160 may couple MSC 140 to location server 170 and to a WWAN almanac server 180. Location server 170 may collect and format location data, may provide assistance to mobile stations for position estimation, and/or may perform computations to obtain position estimates for the mobile stations. WWAN almanac server 180 manages a WWAN almanac database 190, which for this example stores a hierarchical base station almanac for cellular network 110.

In some applications, a WWAN almanac database 190 may include information that does not often change. However, in some situations, a network operator may decide to change or renumber its mobile network code, change or renumber one or more local area code(s) associated with the mobile network code, change or renumber one or more base station identifier associated with a local area code. For example, a new base station may be added to the cellular network, or a base station identifier may be changed or renumbered by a network operator.

According to aspects of the present disclosure, mobile stations may gather the observed WWAN almanac information and periodically report/upload such gathered WWAN almanac information to a crowdsourcing server, such as the WWAN almanac server 180. Upon crowdsourcing and updating the WWAN almanac information, the WWAN almanac server 180 may alert other mobile stations in the region with the updated WWAN almanac information in the event cellular network 120 may have been modified in a way that warrants alerting the mobile stations. In addition, mobile stations may request for updated WWAN almanac information at least in part in response to receiving such an alert from the WWAN almanac server.

According to aspects of the present disclosure, WWAN almanac server 180 may provide WWAN almanac information to mobile station 150. Information to be included in the WWAN almanac provided to mobile station 150 may be a subset of WWAN almanac database 190 selected based at least in part upon any of a number of parameters specified by the mobile station. Such parameters may include one or more networks or sub-networks specified by mobile stations 150*a* and 150*b*, the amount of the data each mobile station may be able to store, the specific content of the data, and/or the granularity of the data, to name but a few examples of parameters that may be specified by the mobile station. Such parameters may be referred to as base station almanac specification parameters. For other examples of a specification parameter that may be specified by the mobile station, the request from a mobile station may be based at least in part upon a particular service provider, a particular network identifier, a mobile device's capability, and/or a particular frequency or band class.

In some applications, a mobile station (150*a* or 150*b*) may request one or more different network types, with various levels of requested granularity and region size. In another aspect, the amount of information conveyed to the mobile station may be determined by the network identifier, available space, or geographic constraints. The geographic constraints may comprise, for example all transmitters within a certain radius or within a geographic region, or all transmitters whose coverage areas intersect a certain radius from a known position of the mobile station, or all regions whose coverage areas overlap with a radius around the region in which the mobile is estimated to be.

Figure 2:
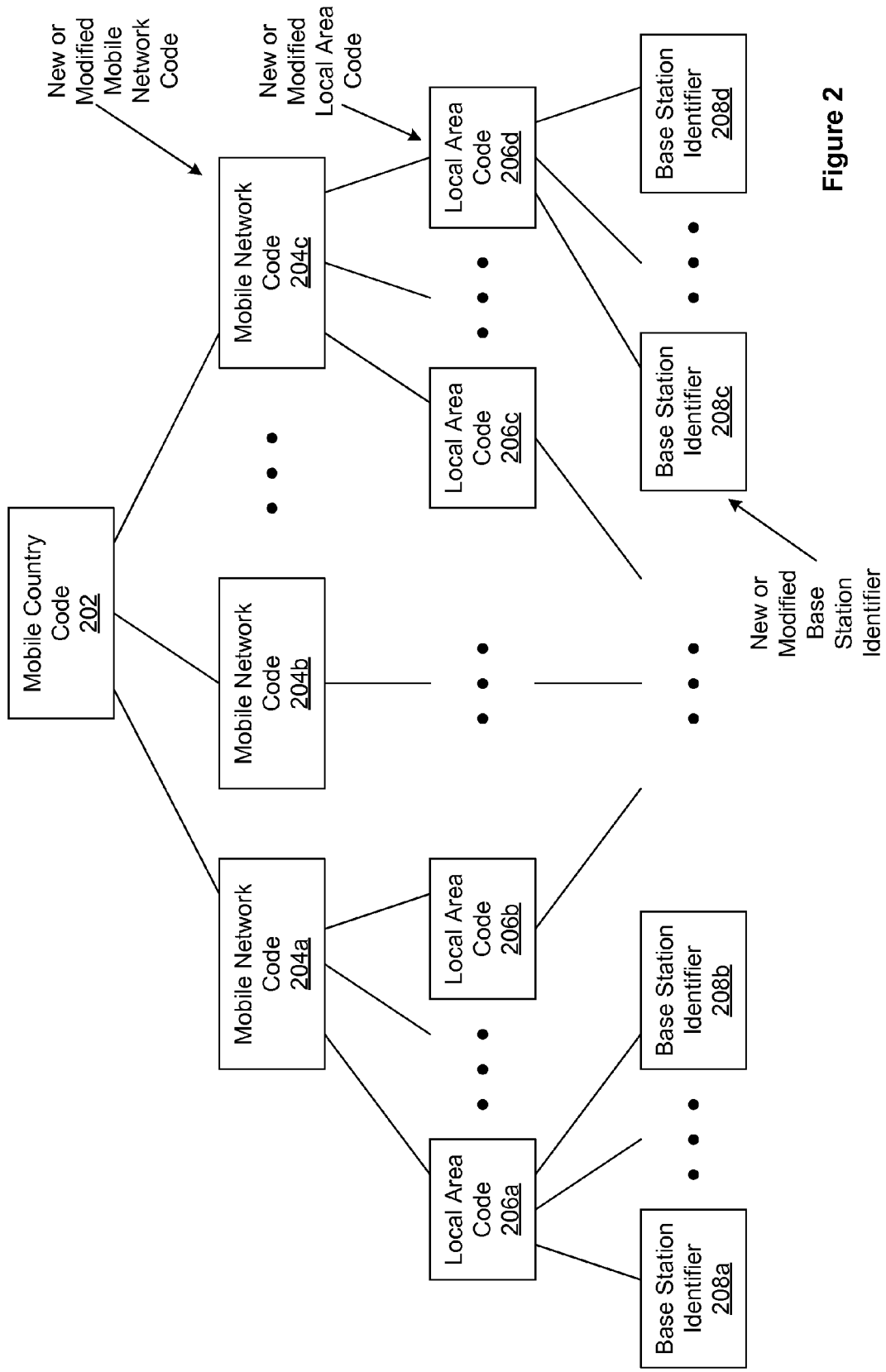
FIG. 2 illustrates a method of tracking changes to the WWAN almanac according to aspects of the present disclosure.

FIG. 2 illustrates a method of tracking changes to the WWAN almanac according to aspects of the present disclosure. In the example shown in FIG. 2, WWAN almanac may be arranged in a hierarchical structure, which includes the ability to monitor and to track new or modified elements in each level of the hierarchical structure. In one implementation, the WWAN almanac includes mobile country code 202, a plurality of mobile network codes (204*a*, 204*b* 204*c*, etc.), a plurality of local area codes (206*a*, 206*b*, 206*c*, 206*d*, etc.), and a plurality of base station identifiers (208*a*, 208*b*, 208*c*, 208*d*, etc.). Note that FIG. 2 illustrates one embodiment of a WWAN. Person skilled in the art would understand that different types of WWAN may use different terminologies to describe the different elements in the hierarchical structure illustrated in FIG. 2.

As depicted in FIG. 2, a new wireless network operator/carrier may be added which results in a new mobile network code, or an existing wireless network operator may change its mobile network code as a result of merger and acquisition. Similarly as depicted in FIG. 2, under each mobile network, a new local area code may be added, or an existing local area code may be changed in response to balancing the number of user accounts within a local area. Under each local area, a new base station may be added or an existing base station may be renamed or renumbered in response to adjusting the coverage for the mobile stations in the local area. Each of the above change may adversely impact the integrity of the WWAN almanac, and which may adversely affect a position fix generated using the WWAN almanac. According to aspects of the present disclosure, the changes in the WWAN almanac are observed by a plurality of crowdsourcing mobile stations, and such changes are reported to a crowdsourcing server that monitors and maintains the WWAN almanac database through the process of crowdsourcing.

In some implementations, WWAN almanac information to be delivered to mobile stations 150*a* and 150*b* may be formatted to provide relatively broad area coverage and relatively coarse information. Alternatively, the WWAN almanac information may be formatted to provide more refined coverage information, if such information is available. In this manner, a mobile station may specify a particular granularity or may specify a "best available" granularity in its request to WWAN almanac server 180. In other implementations, a mobile station may also request WWAN almanac information that is deemed to be highly reliable, or the mobile station may request other information, with reliability information included. Exemplary types of information that may be deemed to be highly reliable may include information provided by a network operator, for example the network operator voluntarily provides changes and updates to its network to the WWAN almanac served 80. Other types of information may include information representing the amount of data used to determine the transmitter information or a confidence estimate, a parameter to indicate the level of completeness of the almanac information and/or its age, for example.

Figure 3:
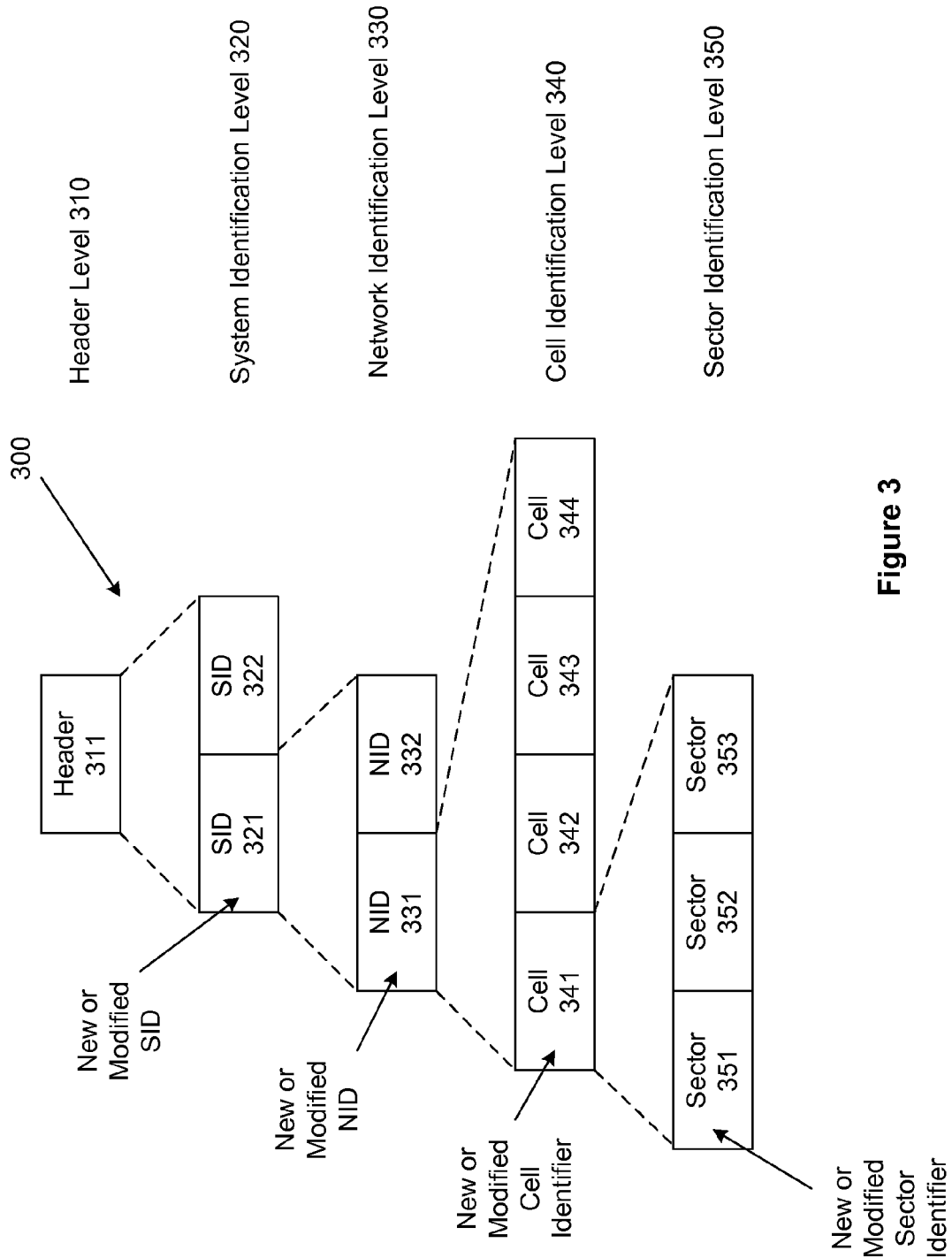
FIG. 3 illustrates another method of tracking changes to the WWAN almanac according to aspects of the present disclosure.

FIG. 3 illustrates another method of tracking changes to the WWAN almanac according to aspects of the present disclosure. As shown in FIG. 3, WWAN almanac 300 may be arranged in a hierarchical structure, which includes the ability to monitor and to track new or modified elements in each level of the hierarchical structure. In one implementation, the WWAN almanac includes header 311 in header level 310, a plurality of system identifiers (SID) 321-322 in system identification level 320, a plurality of network identifiers (NID) 331-332 in network identification level 330, a plurality of cell identifiers (Cell) 341-344 in cell identification level 340, and a plurality of sectors (Sector) 351-353 in sector identification level 350.

As depicted in FIG. 3, a wireless network operator/carrier may add a new SID, or an existing SID may be modified as a result of merger and acquisition, for example. Similarly, as depicted in FIG. 3, under each SID, a NID may be added, or an existing NID may be changed in response to balancing the number of user accounts within the network. Under each NID, a cell may be added or an existing cell may be renamed or renumbered in response to adjusting the coverage for the mobile stations in the cellular network. Under each Cell, a sector may be added or an existing sector may be renamed or renumbered. Each of the above change may adversely impact the integrity of the WWAN almanac, and which may adversely affect a position fix generated using the WWAN almanac. According to aspects of the present disclosure, the changes in the WWAN almanac are observed by a plurality of crowdsourcing mobile stations, and such changes are reported to a crowdsourcing server that monitors and maintains the WWAN almanac database through the process of crowdsourcing.

According to aspects of the present disclosure, WWAN almanac 300 may be stored in a WWAN almanac servers 180 and/or WWAN almanac database 190. WWAN almanac 300 may represent information observed by a mobile station and reported by the mobile station. In the discussion that follows, exemplary WWAN almanac encoding schemes are described, as are schemes for selecting information elements for the WWAN almanac. One example type of wireless network comprises a code division multiple access (CDMA) network. CDMA networks, similar to a number of other networks, comprise identifier parameters that may be organized hierarchically. Therefore, it may be advantageous to convey an almanac for a given set of transmitters in a hierarchical fashion. In one implementation, WWAN almanac 300 may comprise a plurality of hierarchical levels. In the example shown in FIG. 3, WWAN almanac 300 comprises a header level 310, a system identification (SID) level 320 that may comprise one or more system identification level entries, a network identification level (NID) 330 that may comprise one or more network identification level entries, a cell identification level 340, and a sector identification level 350. Also for the example of FIG. 3, SID level 320 comprises a pair of entries SID 321 and SID 322, NID level 330 comprises entries NID 331 and NID 332, cell identification level 340 comprises cell entries 341-344, and sector identification level 350 comprises sector entries 351-353. NID entries 331 and 332 may comprise one or more network identifiers that may identify one or more network providers, for one example. Cell entries 341-344 may comprise one or more cell identification values and/or one or more base station identifiers, and sector entries 351-353 may comprise one or more sector identification values.

Figure 4A:
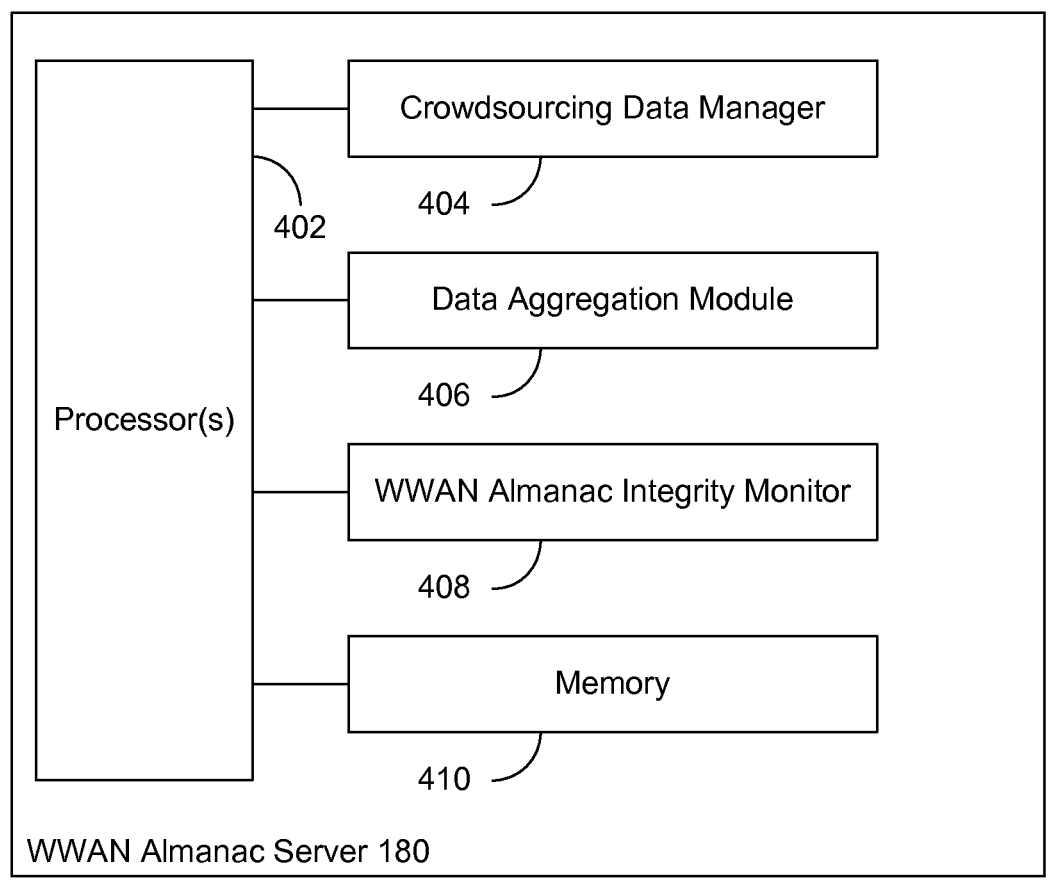
FIGS. 4A-4B illustrate an exemplary crowdsourcing system according to aspects of the present disclosure.
Figure 4B:
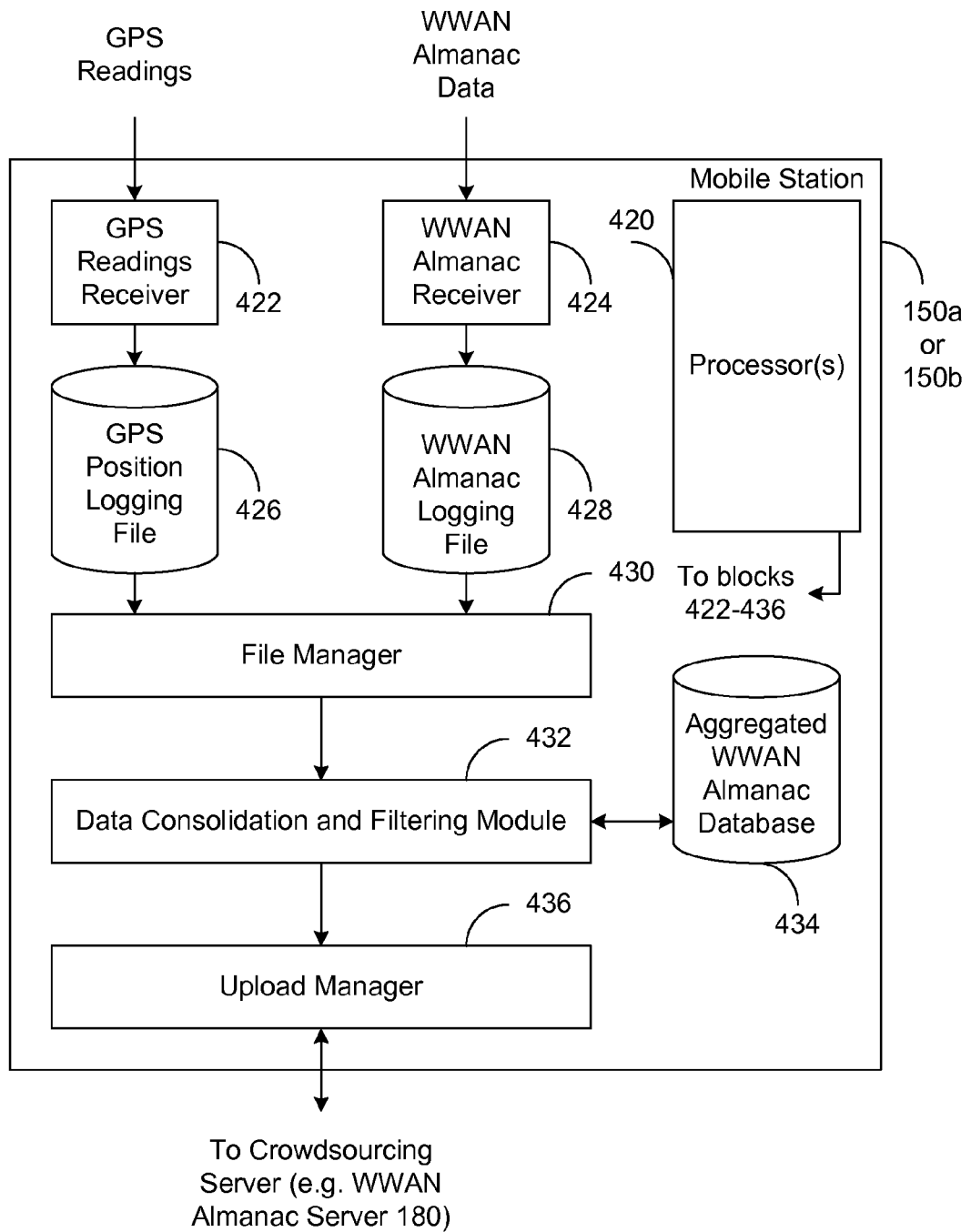

FIGS. 4A-4B illustrate an exemplary crowdsourcing system according to aspects of the present disclosure. The crowdsourcing system includes a plurality of crowdsourcing clients which may be implemented by mobile stations such as 150a and 150b, and one or more crowdsourcing server(s), which may be implemented by the WWAN almanac server 180.

In the exemplary block diagram shown in FIG. 4A, a crowdsourcing server (for example implemented by WWAN almanac server 180) includes one or more processors 402, crowdsourcing data manager 404, data aggregation module 406, WWAN almanac integrity monitor 408, and memory 410. The crowdsourcing data manager 404 communicates with one or more crowdsourcing clients (for example implemented by 150a and 150b) via a network, which may be a cellular network 120 or a WiFi network. The crowdsourcing data manager 404 gathers crowdsourced WWAN almanac data gathered by the crowdsourcing clients. The data aggregation module 406 receives the crowdsourced WWAN almanac data and consolidates such data in the memory 410. The one or more processors 402 can be configured to control/interface with crowdsourcing data manager 404, and data aggregation module 406, WWAN almanac integrity monitor 408, and memory 410 to perform the functions described by each of the blocks.

As shown in FIG. 4B, the mobile client (150a or 150b) includes one or more processors 420, GPS readings receiver 422, WWAN almanac receiver 424, GPS position logging file 426, WWAN almanac list logging file 428, file manager 430, data consolidation and filtering module 432, aggregated WWAN almanac database 434, and upload manager 436. The GPS readings receiver 422 receives GPS readings and uses this information to update the GPS position logging file 426. Similarly, the WWAN almanac receiver 424 receives WWAN almanac information and uses this information to update the WWAN almanac list logging file 428. The file manager 430 matches observations in the WWAN almanac list logging file 428 to their corresponding GPS positions in the GPS position logging file 426. The data consolidation and filtering module 432 takes input from the file manager 430 to generate a local aggregated WWAN almanac file, which is stored in the aggregated WWAN almanac database 434. The upload manager 436 is configured to upload the consolidated and filtered WWAN almanac data and sends the information to a WWAN almanac server 180 via a communication network. The one or more processors 420 can be configured to control/interface with GPS readings receiver 422, WWAN almanac receiver 424, file manager 430, data consolidation and filtering module 432, and upload manager 436 to perform the functions described by each of the blocks.

According to embodiments of the present disclosure, the mobile client can be configured to organize measurements of the WWAN almanac it has observed. In addition, the mobile client can be configured to minimize repetitive and redundant measurements, consolidate the measurements, and upload the WWAN almanac data to the crowdsourcing server. The consolidation process at the mobile client may involve quantizing and processing of collected data to reduce the amount of data to be uploaded.

In one approach, the mobile client can be configured to collect time-stamped sets of WWAN almanac data, and process the collected data to select an appropriate sub-set for upload to the crowdsourcing server. Various implementations may be employed to trigger a data collection, including but not limited to: triggers to initiate an opportunistic-based data collection, triggers to initiate a timer-based data collection, and triggers to initiate a failure-based data collection. For example, an opportunistic-based data collection may be triggered by a successful GNSS fix by a mobile client, a WWAN almanac scan by the mobile client, and/or a failed GNSS fix by the mobile client.

In another approach, a timer-based data collection may be triggered by an elapsed time since the last WWAN almanac data collection. This can be done to insure that some data is collected by the mobile client. In some implementations, the GNSS fix may be acquired before the WWAN almanac scan for timer-based observations. In yet another approach, a failure-based data collection may be triggered based on failure of a positioning fix due to low hit ratio on existing data.

Note that the crowdsourcing server (for example may be implemented by the WWAN almanac server 180) can be configured to collect the WWAN almanac crowdsourcing data from its participating mobile clients (also referred to as crowdsourcing clients), and use the collected data to create and maintain the WWAN almanac database 190 for various applications. For example, the crowdsourcing server can be configured to organize the uploaded WWAN almanac crowdsourcing data from participating mobile clients. In some applications, the crowdsourcing server may be configured to make position estimates using the WWAN almanac data. In some implementations, the parameters that are estimated for each base station may include, but not limited to: 1) base station position latitude in degrees; 2) base station position longitude in degrees; 3) base station's MAR (coverage radius) in meters; and 4) base station's horizontal position uncertainty in meters.

Figure 5:
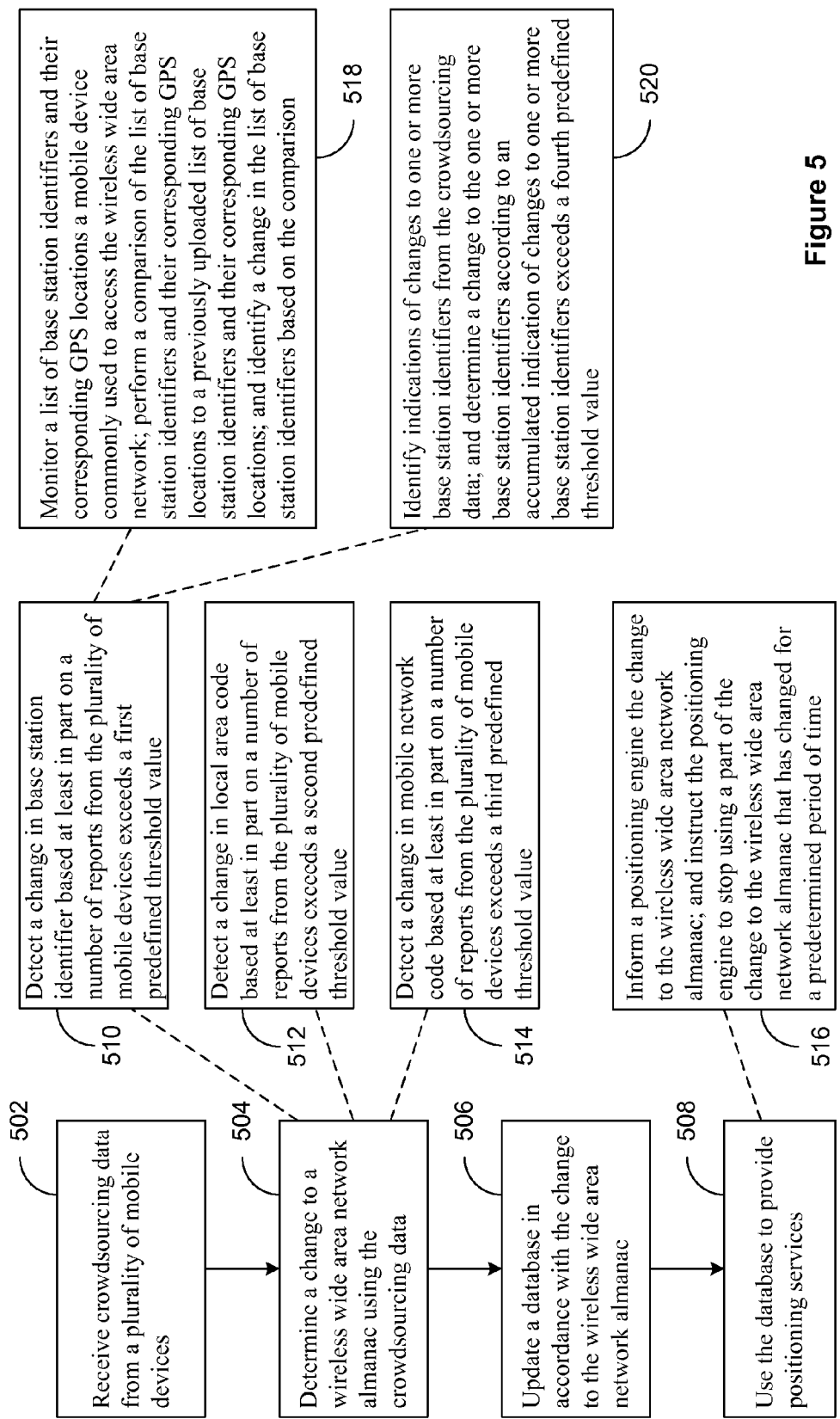
FIG. 5 illustrates a flow chart of monitoring WWAN almanac integrity according to some aspects of the present disclosure.

FIG. 5 illustrates a flow chart of monitoring WWAN almanac integrity according to some aspects of the present disclosure. In block 502, the one or more processors can be configured to receive crowdsourcing data from a plurality of mobile devices. In block 504, the one or more processors can be configured to determine a change to a wireless wide area network almanac using the crowdsourcing data. In block 506, the one or more processors can be configured to update a database in accordance with the change to the wireless wide area network almanac.

According to aspects of the present disclosure, the crowdsourcing data includes the wireless wide area network almanac and GPS locations used by the plurality of mobile devices for accessing the wireless wide area network. The wireless wide area network almanac comprises a hierarchical description of country code, network code, local area code, and base station identifier used in the wireless wide area network.

According to embodiments of the present disclosure, the methods performed in block 504 may further include methods performed in blocks 510, 512, and 514; and the methods performed in block 510 may further include methods performed in blocks 518 and 520. In block 510, the one or more processors can be configured to detect a change in base station identifier based at least in part on a number of reports from the plurality of mobile devices exceeds a first predefined threshold value. In block 512, the one or more processors can be configured to detect a change in local area code based at least in part on a number of reports from the plurality of mobile devices exceeds a second predefined threshold value. In block 514, one or more processors can be configured to detect a change in mobile network code based at least in part on a number of reports from the plurality of mobile devices exceeds a third predefined threshold value.

In some implementations, the first predefined threshold value, the second predefined threshold value, and the third predefined threshold value may be programmable parameters, and their corresponding programmed values may depend on the particular network, location, number of users in the network, and number of users who participate as crowdsourcing clients. In one approach, the first predefined threshold value may be set to 20; the second predefined threshold value may be set to 200, and the third predefined threshold value may be set to 1000. In another approach, the first predefined threshold value, the second predefined threshold value, and the third predefined threshold value may be programmed to different values than the ones listed above.

In block 518, the one or more processors can be configured to monitor a list of base station identifiers and their corresponding GPS locations a mobile device commonly used to access the wireless wide area network, perform a comparison of the list of base station identifiers and their corresponding GPS locations to a previously uploaded list of base station identifiers and their corresponding GPS locations, and identify a change in the list of base station identifiers based on the comparison.

According to aspects of the present disclosure, the list of base station identifiers is selected based at least in part on at least one of, including but not limited to: an accumulated total number of observations by a mobile device, a total number of uses of the base station by the mobile device, a time of last use of the base station by the mobile device, a time of last download from the base station by the mobile device, and a distance between the base station and the mobile device.

In block 520, the one or more processors can be configured to identify indications of changes to one or more base station identifiers from the crowdsourcing data, and determine a change to the one or more base station identifiers according to an accumulated indication of changes to one or more base station identifiers exceeds a fourth predefined threshold value.

In block 508, the one or more processors can be configured to use the database to provide positioning services. In block 516, the one or more processors can be configured to inform a positioning engine the change to the wireless wide area network almanac, and/or instruct the positioning engine to stop using a part of the change to the wireless wide area network almanac that has changed for a predetermined period of time.

Referring back to FIG. 3, for a given set of transmitters, an amount of information may be provided in header 311, and at least a portion of the information stored in header 311 may be referenced as descriptions are added in any of the lower levels of the hierarchy. At any of the lower levels, the information stored in the header may be overridden for a particular entry, thereby allowing for exceptions to be made for the information stored in header 311. According to aspects of the present disclosure, CDMA is merely an example network type. Universal Mobile Telecommunications System (UMTS) and Global System for Mobile communications (GSM) are other examples of hierarchically organized networks, each with variations in how they operate. For example, GSM comprises a Time Division Multiple Access (TDMA) based system, so frequency, slot timing and color code information may be stored in WWAN almanac 300. For CDMA, pseudorandom number (PN) offset signal identifier information may be stored in WWAN almanac 300. For UMTS, PN code signal identifier information may be stored in WWAN almanac 300. In some approaches, WWAN almanac 300 may store information for a single network type, or may store information for multiple network types.

In an aspect, header 311 may include a collection of information. Several example types of information that may be stored in header 311 are described herein. Header 311 may store an enumerated frequency list, for example. Because the set of frequencies supported tend to not vary much, if at all, from transmitter to transmitter and from sector to sector, a default set of frequencies may be assumed, and a listing of the default frequencies may be stored in header 311. That is, rather than store the list of supported frequencies in each cell or sector entry, the list of supported frequencies may be stored in header 311. In the event that a transmitter or sector supports a set of frequencies that differ from that stored in header 311, the exception(s) may be noted in an explicit entry in a lower level. For example, if a sector corresponding to sector entry 351 supports an alternate set of frequencies, those frequencies may be listed in sector entry 351 in sector identification level 350. The frequencies listed in the sector entry 351 for this example override the listing stored in header 311 as far as that particular sector is concerned.

In a further aspect, header 311 may store information related to the number of bits that are used for a sector ID. This may be advantageous because a sector ID may be encoded into a base station ID in many cases, but may be encoded in any of a number of different ways. In addition to the number of bits used for the sector ID, the information stored in header 311 may include information specifying whether the sector ID comprises the most significant bits of the base station ID or the least significant bits.

Continuing with the example of WWAN almanac 300, header 311 may store statistical information for WWAN almanac 300. Example statistics may include, but are not limited to, median size of a coverage area, median terrain height, range of terrain heights, number of bits used to convey terrain height offsets and the scale of those bits, timing information, and/or median and range of antenna position uncertainties found at cell identification level 340. In an aspect, the timing information may comprise one or more of median and range of forward link calibration values such as code division multiple access (CDMA) forward link calibration values, median and range of forward link calibration uncertainties, and/or a universal mobile telecommunications system (UMTS) frame timing relationship. Another example statistic may comprise the number of sectors per cell. In one aspect, the number of sectors per cell may be specified in header 311 if the number varies from the typical number of three sectors per cell. Although the information mentioned above is described as being stored at header 311, such information may be pushed to lower levels of the hierarchy. In addition to some or all of the information described above, header 311 may further specify a value of a count of system identification (SID) entries to follow in system identification level 320, which for example WWAN almanac 300 comprises the next lower level beneath header 311 in the hierarchical organization.

In another aspect, general purpose information related to one or more systems may be provided. Information that may be listed in SID 321 and/or SID 322 for this example may comprise, for example, a system identifier and/or a coverage area shape, position and/or size. In one aspect, the position of the coverage area may be conveyed as an offset from a reference point. In an aspect, the reference point may be specified in header 311. Alternatively, in another aspect, the position of the coverage area may be conveyed in absolute terms. For example, the position may be conveyed as a longitude, latitude, and height above ellipsoid. Example coordinate systems that may be used include the World Geodesic System (WGS-84) and the Earth-Centered, Earth-Fixed (ECEF) coordinate system. SID entries 321 and 322 for this example may include a description of the number of NID entries that follow in the next lower level of the hierarchy. SID entries 321 and 322 may further include pointers to one or more NID entries that are associated with the respective SID entries, if any. For the example of WWAN almanac 300, no NID entries are associated with SID 322, while NID entries 331 and 332 are associated with SID 321. SID 321 may include a description of the number of NID entries associated with SID 321, and in one aspect SID may include a pointer to one or more of NID 331 and 332. In another aspect, a mechanism may be provided in the WWAN almanac encoding scheme to know the end of the NID entries.

Continuing with the example of WWAN almanac 300, the encoding at NID level 330 may be similar to that described above with respect to SID level 320. For example, at NID level 330, exceptions to information stored in SID 321 and/or header 311 may be noted in either or both of NID 331 or 332. For example, a given NID may support different frequencies from those listed in header 311. Those differences may be noted at NID level 330 in order to minimize the repetition of frequency difference information in the lower cell identification and/or sector identification levels. Other exceptions may be noted that may be related to any of the statistical information listed in header 311, for example. Such noted exceptions within NID 331 and/or NID 332 may override the header information for those NID entries noting the exception, and for any entries from lower levels that are associated with the NID entries noting the exception. Additionally, for WWAN almanac 300, the NID entries may include the number of cell identification entries to follow, and the NID entries may further include one or more pointers to one or more cell identification entries. For example, as depicted in FIG. 3, NID 331 may indicate that four cell identification entries follow, and a pointer may be provided to one or more of cell identification entries 341-344 that are associate with NID 331. Alternatively, a mechanism may be provided in the WWAN almanac encoding scheme to know the end of the cell identification entries.

In another aspect, cell identification layer 340 for WWAN almanac 300 comprises cell identification entries 341, 342, 343, and 344. The individual cell identification entries may comprise cell IDs and may comprise positions for the antennas associated with the individual cells. According to aspects of the present disclosure, a base station ID may comprise a combination of a cell ID and a sector ID. In one implementation, a base station ID may comprise 16 bits. If a particular number of bits of the base station ID are dedicated to the sector ID, only the cell ID bits need to be conveyed at cell identification level 340. In another aspect, any differences in antenna position from sector-to-sector may be noted in one or more entries of cell identification level 340. Also, antenna positions may be expressed as offsets from the NID reference position described above, or may be expressed in absolute coordinates, similar to the coordinates described above in connection with NID level 330. Further, in an aspect, exceptions to the list of supported frequencies stored in header 311 or exceptions to any other list in other higher levels of the hierarchy may be noted in one or more of cell entries 341-344. One or more of cell entries 341-344 may further include information related to uncertainty properties related to antenna position and/or base station position. Additionally, for another example of the type of information that may be stored in one or more of the entries of cell identification level 340, one or more flags may be set to indicate that the number of sectors or the number of bits used to encode the sector identifiers varies from the typical value stored in a higher level entry. In another aspect, if the size of the coverage areas for the various sectors of associated with one or more of cell entries 341, 342, 343, and/or 344 are similar, the cell entries with the similar coverage areas for their respective sectors may include the sector coverage area information so that the information need not be repeated in each sector entry. Such information may also be store in higher levels of the hierarchy in some circumstances, depending on the uniformity of the coverage areas across the sector of the various cells.

At sector identification level 350, which comprises sector entries 351-353 associated with cell entry 341, any exceptions to the information stored in any of the higher levels of the hierarchy may be noted. In an aspect, PN offset values may be explicitly noted. Further, offsets to any of the range of values defined at higher levels may also be noted. Such offsets may include, for example, antenna position offsets, forward link calibration offsets, terrain height information, frequency information, etc.

Although the above discussion in connection with WWAN almanac 300 depicted in FIG. 3 mentions specific examples of the types of information that may be stored at various layers of the hierarchy, and also mentions specific examples of relationships and configurations among various entries and various levels, such types of information and relationships and configurations are merely examples, and the scope of claimed subject matter is not limited in theses resects. For example, other implementations may comprise more levels than depicted in WWAN almanac 300, or may comprise fewer levels. Similarly, additional types of information or fewer types of information may be included in WWAN almanac 300 than those discussed in the examples above.

Note that at least the following three paragraphs, FIG. 1, FIG. 3, FIGS. 4A-4B, FIG. 5 and their corresponding descriptions provide means for receiving crowdsourcing data from a plurality of mobile devices; means for determining a change to a wireless wide area network almanac using the crowdsourcing data; means for updating a database in accordance with the change to the wireless wide area network almanac; means for detecting a change in base station identifier based at least in part on a number of reports from the plurality of mobile devices exceeds a first predefined threshold value; means for detecting a change in local area code based at least in part on a number of reports from the plurality of mobile devices exceeds a second predefined threshold value; means for detecting a change in mobile network code based at least in part on a number of reports from the plurality of mobile devices exceeds a third predefined threshold value; means for monitoring a list of base station identifiers and their corresponding GPS locations a mobile device commonly used to access the wireless wide area network; means for performing a comparison of the list of base station identifiers and their corresponding GPS locations to a previously uploaded list of base station identifiers and their corresponding GPS locations; means for identifying a change in the list of base station identifiers based on the comparison; means for identifying indications of changes to one or more base station identifiers from the crowdsourcing data; and means for determining a change to the one or more base station identifiers according to an accumulated indication of changes to one or more base station identifiers exceeds a fourth predefined threshold value.

The methodologies, mobile devices, and servers described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data can be configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of monitoring integrity of wireless wide area network almanac in a wireless wide area network, comprising:
  receiving crowdsourcing data from a plurality of mobile devices;
  determining a change to a wireless wide area network almanac using the crowdsourcing data, wherein determining a change to a wireless wide area network almanac comprises detecting a change in base station identifier based at least in part on a number of reports from the plurality of mobile devices exceeds a first predefined threshold value; and
  updating a database in accordance with the change to the wireless wide area network almanac.

2. The method of claim 1, wherein the crowdsourcing data includes the wireless wide area network almanac and GPS locations used by the plurality of mobile devices for accessing the wireless wide area network.

3. The method of claim 2, wherein the wireless wide area network almanac comprises a hierarchical description of country code, network code, local area code, and base station identifier used in the wireless wide area network.

4. The method of claim 1, wherein determining a change to a wireless wide area network almanac using the crowdsourcing data comprises:
  detecting a change in local area code based at least in part on a number of reports from the plurality of mobile devices exceeds a second predefined threshold value;
  detecting a change in mobile network code based at least in part on a number of reports from the plurality of mobile devices exceeds a third predefined threshold value; or some combination thereof.

5. The method of claim 1, wherein detecting a change in base station identifier comprises:
  monitoring a list of base station identifiers and their corresponding GPS locations a mobile device commonly used to access the wireless wide area network;
  performing a comparison of the list of base station identifiers and their corresponding GPS locations to a previously uploaded list of base station identifiers and their corresponding GPS locations; and
  identifying a change in the list of base station identifiers based on the comparison.

6. The method of claim 5, wherein the list of base station identifiers is selected based at least in part on:
  an accumulated total number of observations by a mobile device;
  a total number of uses of the base station by the mobile device;
  a time of last use of the base station by the mobile device;
  a time of last download from the base station by the mobile device;
  a distance between the base station and the mobile device; or some combination thereof.

7. The method of claim 1, wherein detecting a change in base station identifier further comprises:
  identifying indications of changes to one or more base station identifiers from the crowdsourcing data; and
  determining a change to the one or more base station identifiers according to an accumulated indication of changes to one or more base station identifiers exceeds a fourth predefined threshold value.

8. The method of claim 1, further comprising:
  using the database to provide positioning services.

9. The method of claim 8, wherein using the database to provide positioning services comprises:
  informing a positioning engine the change to the wireless wide area network almanac;
  instructing the positioning engine to stop using a part of the change to the wireless wide area network almanac that has changed for a predetermined period of time; or some combination thereof.

10. An apparatus configured to monitor integrity of wireless wide area network almanac in a wireless wide area network, comprising:
  one or more processors including processing logic, the processing logic comprising:
  logic configured to receive crowdsourcing data from a plurality of mobile devices;
  logic configured to determine a change to a wireless wide area network almanac using the crowdsourcing data, wherein logic configured to determine a change to a wireless wide area network almanac comprises logic configured to detect a change in base station identifier based at least in part on a number of reports from the plurality of mobile devices exceeds a first predefined threshold value; and
  logic configured to update a database in accordance with the change to the wireless wide area network almanac.

11. The apparatus of claim 10, wherein the crowdsourcing data includes the wireless wide area network almanac and GPS locations used by the plurality of mobile devices for accessing the wireless wide area network.

12. The apparatus of claim 11, wherein the wireless wide area network almanac comprises a hierarchical description of country code, network code, local area code, and base station identifier used in the wireless wide area network.

13. The apparatus of claim 10, wherein logic configured to determine a change to a wireless wide area network almanac using the crowdsourcing data comprises:
  logic configured to detect a change in local area code based at least in part on a number of reports from the plurality of mobile devices exceeds a second predefined threshold value;
  logic configured to detect a change in mobile network code based at least in part on a number of reports from the plurality of mobile devices exceeds a third predefined threshold value; or some combination thereof.

14. The apparatus of claim 10, wherein logic configured to detect a change in base station identifier comprises:
  logic configured to monitor a list of base station identifiers and their corresponding GPS locations a mobile device commonly used to access the wireless wide area network;
  logic configured to perform a comparison of the list of base station identifiers and their corresponding GPS locations to a previously uploaded list of base station identifiers and their corresponding GPS locations; and
  logic configured to identify a change in the list of base station identifiers based on the comparison.

15. The apparatus of claim 14, wherein the list of base station identifiers is selected based at least in part on:
  an accumulated total number of observations by a mobile device;
  a total number of uses of the base station by the mobile device;
  a time of last use of the base station by the mobile device;
  a time of last download from the base station by the mobile device;

a distance between the base station and the mobile device; or some combination thereof.

16. The apparatus of claim 10, wherein logic configured to detect a change in base station identifier further comprises:
  logic configured to identify indications of changes to one or more base station identifiers from the crowdsourcing data; and
  logic configured to determine a change to the one or more base station identifiers according to an accumulated indication of changes to one or more base station identifiers exceeds a fourth predefined threshold value.

17. The apparatus of claim 10, further comprising:
  logic configured to use the database to provide positioning services.

18. The apparatus of claim 17, wherein logic configured to use the database to provide positioning services comprises:
  logic configured to inform a positioning engine the change to the wireless wide area network almanac;
  logic configured to instruct the positioning engine to stop using a part of the change to the wireless wide area network almanac that has changed for a predetermined period of time; or some combination thereof.

19. A computer program product for monitoring integrity of base station almanac in a wireless wide area network, comprising a non-transitory medium storing computer programs for execution by one or more computer systems, the computer program product comprising:
  code for receiving crowdsourcing data from a plurality of mobile devices;
  code for determining a change to a wireless wide area network almanac using the crowdsourcing data, wherein code for determining a change to a wireless wide area network almanac comprises code for detecting a change in base station identifier based at least in part on a number of reports from the plurality of mobile devices exceeds a first predefined threshold value; and
  code for updating a database in accordance with the change to the wireless wide area network almanac.

20. The computer program product of claim 19, wherein the crowdsourcing data includes the wireless wide area network almanac and GPS locations used by the plurality of mobile devices for accessing the wireless wide area network.

21. The computer program product of claim 20, wherein the wireless wide area network almanac comprises a hierarchical description of country code, network code, local area code, and base station identifier used in the wireless wide area network.

22. The computer program product of claim 19, wherein code for determining a change to a wireless wide area network almanac using the crowdsourcing data comprises:
  code for detecting a change in local area code based at least in part on a number of reports from the plurality of mobile devices exceeds a second predefined threshold value;
  code for detecting a change in mobile network code based at least in part on a number of reports from the plurality of mobile devices exceeds a third predefined threshold value; or some combination thereof.

23. The computer program product of claim 19, wherein code for detecting a change in base station identifier comprises:
  code for monitoring a list of base station identifiers and their corresponding GPS locations a mobile device commonly used to access the wireless wide area network;
  code for performing a comparison of the list of base station identifiers and their corresponding GPS locations to a previously uploaded list of base station identifiers and their corresponding GPS locations; and
  code for identifying a change in the list of base station identifiers based on the comparison.

24. The computer program product of claim 23, wherein the list of base station identifiers is selected based at least in part on:
  an accumulated total number of observations by a mobile device;
  a total number of uses of the base station by the mobile device;
  a time of last use of the base station by the mobile device;
  a time of last download from the base station by the mobile device;
  a distance between the base station and the mobile device; or some combination thereof.

25. The computer program product of claim 19, wherein code for detecting a change in base station identifier further comprises:
  code for identifying indications of changes to one or more base station identifiers from the crowdsourcing data; and
  code for determining a change to the one or more base station identifiers according to an accumulated indication of changes to one or more base station identifiers exceeds a fourth predefined threshold value.

26. The computer program product of claim 19, further comprising:
  code for using the database to provide positioning services.

27. The computer program product of claim 26, wherein code for using the database to provide positioning services comprises:
  code for informing a positioning engine the change to the wireless wide area network almanac;
  code for instructing the positioning engine to stop using a part of the change to the wireless wide area network almanac that has changed for a predetermined period of time; or some combination thereof.

28. An apparatus, comprising:
  means for receiving crowdsourcing data from a plurality of mobile devices;
  means for determining a change to a wireless wide area network almanac using the crowdsourcing data, wherein means for determining a change to a wireless wide area network almanac comprises means for detecting a change in base station identifier based at least in part on a number of reports from the plurality of mobile devices exceeds a first predefined threshold value; and
  means for updating a database in accordance with the change to the wireless wide area network almanac.

29. The apparatus of claim 28, wherein means for determining a change to a wireless wide area network almanac using the crowdsourcing data comprises:
  means for detecting a change in local area code based at least in part on a number of reports from the plurality of mobile devices exceeds a second predefined threshold value;
  means for detecting a change in mobile network code based at least in part on a number of reports from the plurality of mobile devices exceeds a third predefined threshold value; or some combination thereof.

30. The apparatus of claim 28, wherein means for detecting a change in base station identifier comprises:
  means for monitoring a list of base station identifiers and their corresponding GPS locations a mobile device commonly used to access the wireless wide area network;
  means for performing a comparison of the list of base station identifiers and their corresponding GPS locations to a previously uploaded list of base station identifiers and their corresponding GPS locations; and means for identifying a change in the list of base station identifiers based on the comparison.

31. The apparatus of claim 28, wherein means for detecting a change in base station identifier further comprises:

means for identifying indications of changes to one or more base station identifiers from the crowdsourcing data; and means for determining a change to the one or more base station identifiers according to an accumulated indication of changes to one or more base station identifiers exceeds a fourth predefined threshold value.

* * * * *